US012780178B2

(12) United States Patent
Kattenberg et al.

(10) Patent No.: US 12,780,178 B2
(45) Date of Patent: Nov. 3, 2026

(54) METHOD FOR CONTROLLING A VEHICLE, DRIVE CONTROL UNIT AND VEHICLE

(71) Applicant: ZF CV Systems Global GmbH, Bern (CH)

(72) Inventors: Thomas Kattenberg, Vechelde (DE); Johannes Heseding, Hannover (DE); Uwe Bensch, Hannover (DE)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 19/290,148

(22) Filed: Aug. 4, 2025

(65) Prior Publication Data

US 2025/0360913 A1 Nov. 27, 2025

Related U.S. Application Data

(63) Continuation of application No. PCT/EP2024/050833, filed on Jan. 16, 2024.

(30) Foreign Application Priority Data

Feb. 3, 2023 (DE) ..................... 10 2023 102 657.7

(51) Int. Cl.
*B60W 30/02* (2012.01)
*B60W 10/08* (2006.01)
(Continued)

(52) U.S. Cl.
CPC ............ *B60W 30/02* (2013.01); *B60W 10/08* (2013.01); *B60W 10/192* (2013.01);
(Continued)

(58) Field of Classification Search
CPC .... B60W 30/02; B60W 10/08; B60W 10/192; B60W 30/18109; B60W 2510/18;
(Continued)

(56) References Cited

U.S. PATENT DOCUMENTS

| | | | | |
|---|---|---|---|---|
| 8,527,177 | B2 | 9/2013 | Linda et al. | |
| 2022/0315004 | A1* | 10/2022 | Bensch | B60T 8/17616 |
| 2022/0340018 | A1 | 10/2022 | Kaneko et al. | |

FOREIGN PATENT DOCUMENTS

| | | | |
|---|---|---|---|
| DE | 10 2019 135 087 | A1 | 6/2021 |
| DE | 10 2020 112 598 | A1 | 11/2021 |

(Continued)

OTHER PUBLICATIONS

English translation and Written Opinion of the International Searching Authority dated Apr. 22, 2024 for international application PCT/EP2024/050833 on which this application is based.

(Continued)

*Primary Examiner* — Aryan E Weisenfeld
(74) *Attorney, Agent, or Firm* — Walter Ottesen, P.A.

(57) ABSTRACT

A method is for controlling a vehicle having an electric drive for driving wheels. A drive control unit generates a target torque and/or a target rotation speed and outputs them to the relevant drive. The method includes: determining a speed; determining an actual wheel dynamics variable which characterizes the rotational behavior of an individual wheel; determining thresholds associated with the wheels; determining a deviation between the actual wheel dynamics variable and the threshold and, if an impermissible deviation is present: limiting the target torque and/or the target rotation speed for the wheel with the impermissible deviation. If control deviations for the wheels of an axle which are different on different sides are determined, a brake request signal is output by the drive control unit. The limit torque and/or the limit rotation speed is specified/adjusted depending on the braking torque applied by the service brakes.

15 Claims, 3 Drawing Sheets

(51) Int. Cl.
*B60W 10/192* (2012.01)
*B60W 30/18* (2012.01)

(52) U.S. Cl.
CPC ... *B60W 30/18109* (2013.01); *B60W 2510/18* (2013.01); *B60W 2520/10* (2013.01); *B60W 2520/266* (2013.01); *B60W 2520/28* (2013.01); *B60W 2710/081* (2013.01); *B60W 2710/083* (2013.01); *B60W 2710/18* (2013.01)

(58) Field of Classification Search
CPC ....... B60W 2520/10; B60W 2520/266; B60W 2520/28; B60W 2710/081; B60W 2710/083; B60W 2710/18
See application file for complete search history.

(56) References Cited

FOREIGN PATENT DOCUMENTS

| | | | | |
|---|---|---|---|---|
| DE | 10 2021 103 705 B3 | | 6/2022 | |
| DK | 102021103705 | * | 2/2021 | B60T 8/175 |

OTHER PUBLICATIONS

International Search Report of the European Patent Office dated Apr. 22, 2024 for international application PCT/EP2024/050833 on which this application is based.

* cited by examiner

METHOD FOR CONTROLLING A VEHICLE, DRIVE CONTROL UNIT AND VEHICLE

CROSS-REFERENCE TO RELATED APPLICATIONS

This application is a continuation application of international patent application PCT/EP2024/050833, filed Jan. 16, 2024, designating the United States and claiming priority from German application 10 2023 102 657.7, filed Feb. 3, 2023, and the entire content of both applications is incorporated herein by reference.

TECHNICAL FIELD

The disclosure relates to a method for controlling a vehicle, to a drive control unit for carrying out the method, and to a vehicle having the drive control unit.

BACKGROUND

In order to ensure vehicle stability, it is necessary, when driving/setting off the vehicle, to limit excessive wheel slip (drive slip), which results from a driving torque that is too high for the given coefficient of friction of the ground. This limitation must take place in a form that is suitable for applying, in addition to propulsion, also the necessary lateral guiding force. To this end, a high-dynamic and precise limitation of the driving torque realized by the respective drive is first necessary.

In the case of wheel-individual electric drives, it is generally only the drive on the respective spinning wheel that is capable of controlling the wheel slip at the individual wheels, for example in that the requested setpoint driving torque is limited by a drive control unit in a slip control circuit. For central drives, which electrically drive the wheels of the vehicle on each axle individually, drive slip control (ASR) is frequently implemented in the electronic braking system and is controlled, for example, by a brake control unit. The brake control unit monitors actual wheel rotational speeds of the individual wheels and then calculates a limitation for the setpoint driving torque of these wheels for each axle and transmits it to the drive control unit for the axle-based outputting of correspondingly limited setpoint driving torques for the wheels of the respective vehicle axle. If a different slip behavior is then still present for the wheels of this vehicle axle, brake interventions can optionally also be carried out at the individual wheels via the service brakes of the electronic braking system, wherein this is effected by the slip control circuit implemented in the brake control unit as part of drive slip control (ASR).

However, the dynamics of such control for central drives with the assistance of the brake interventions at the individual wheels is then generally limited on account of the control that is implemented in the brake control unit of the electronic braking system. By comparison, control of a specific wheel slip in the case of wheel-individual electric drives takes place directly via the drive control unit (by limiting the setpoint driving torque) with the highest possible dynamics.

SUMMARY

It is an object of the present disclosure to provide a method for controlling a vehicle with which safe operation of the vehicle in terms of driving dynamics can be ensured in a simple manner. It is a further object of the disclosure to provide a drive control unit and a vehicle.

The mentioned objects are achieved by a method, a drive control unit and a vehicle according to various embodiments of the disclosure.

Accordingly, there is provided according to the disclosure a method for controlling a vehicle having a drive system, wherein the drive system includes a drive control unit and at least one electric drive for the wheel-individual or axle-individual driving of wheels of the vehicle, wherein the drive control unit is configured to generate a setpoint driving torque and/or a setpoint drive rotational speed in dependence on a drive demand and to output them/it to the respective drive, and:

- a braking system, wherein the braking system includes a brake control unit and service brakes for the wheel-individual braking of the wheels of the vehicle, the method having at least the following steps:
- importing or ascertaining a vehicle velocity of the vehicle;
- importing or ascertaining at least one actual wheel dynamics variable that characterizes the rotational behavior of an individual wheel;
- importing or ascertaining threshold values, assigned to the wheels, for the respective actual wheel dynamics variable;
- ascertaining a control deviation between the actual wheel dynamics variable of a wheel and the threshold value assigned to the same wheel and, if an inadmissible control deviation for the wheel that is being driven by a drive is present, in particular if the threshold value for that wheel is exceeded:
- limiting the setpoint driving torque and/or the setpoint drive rotational speed for the electric drive by which the wheel with the inadmissible control deviation is being driven to a limit driving torque and/or a limit drive rotational speed, and
- ascertaining whether the inadmissible control deviation for the respective wheel is different from a control deviation for at least one further wheel that is on the same vehicle axle and is being driven by the same electric drive, in particular central electric drive (central drive),
- wherein, if control deviations that are different on different sides are ascertained for the wheels of a vehicle axle, an external braking demand signal is generated by the drive control unit and outputted to the brake control unit, and the service brake at least on that wheel of the respective vehicle axle for which a higher control deviation is present is actuated on the basis of the signal,
- wherein the limit driving torque and/or the limit drive rotational speed are/is specified or adjusted in dependence on the braking torque applied by the actuated service brakes, so that, as a result of the brake interventions and the limiting of the driving torque in combination, an admissible control deviation for the respective wheel is subsequently obtained while the respective threshold value is maintained.

As a result, it is advantageously recognized that an additional braking action at one of the wheels of a vehicle axle can be accompanied by an increased driving torque at another wheel of the same vehicle axle. This is because, as a result of the additional braking action, the limitation of the driving action is weaker, which manifests itself in the case of central drives in an increase in the driving action at the other, unbraked wheel. Overall, the propulsion is thus increased while at the same time the threshold values for the rotational behavior of the wheels are maintained.

According to various embodiments, it is further provided that there is ascertained or imported as at least one actual wheel dynamics variable:

an actual slip of the respective wheel and/or an actual rotational speed of the respective wheel or of the respective drive and/or an actual velocity of the respective wheel or of the respective drive.

In this manner, the rotational behavior of the respective wheel can be considered in different ways, wherein the brake control unit and/or the drive control unit are/is able to ascertain these variables and to provide them for further processing in a simple manner. As a result of the values being ascertained and provided twice, a plausibilization of the values can advantageously also be carried out.

According to various embodiments, it is further provided that actual wheel rotational speeds of the respective wheel are ascertained or imported as the actual wheel dynamics variable, wherein the actual wheel rotational speeds are measured via a wheel rotational speed sensor on the respective wheel and/or via a rotational speed sensor downstream of outputs on different sides of a differential on the respective vehicle axle. The rotational behavior of the wheels in the form of the wheel rotational speeds can thus be ascertained in different ways, wherein a plausibilization can also take place as a result of a double acquisition. The respective actual wheel dynamics variable can then also be ascertained, or calculated, from the wheel rotational speeds.

According to various embodiments, it is further provided that there is ascertained or imported as the threshold value for the respective wheel:

a slip threshold value and/or a rotational speed threshold value and/or a velocity threshold value.

Depending on which actual wheel dynamics variable is considered, a respective threshold value can thus also be assigned and it can then be checked, for each individual wheel, whether the threshold value is exceeded, in order to be able to detect an inadmissible deviation in the wheel rotational behavior.

According to various embodiments, it is further provided that the actual wheel dynamics variable for the respective wheel is ascertained or imported by the drive control unit and/or by the brake control unit, and/or the threshold values for the respective wheel are also ascertained in the drive control unit and/or in the brake control unit. Consequently, the ascertainment of the rotational behavior of the wheels can be acquired and also the threshold values can be specified in the drive system itself, which minimizes the transmission paths and thus speeds up the control, that is, the limitation, of the drive power and the specification of the wheel-individual braking action, since this control is carried out in the drive system, or the drive control unit. However, since the braking system, or the brake control unit, specifies threshold values for the rotational behavior of the wheels that it ascertains itself, for example for stability control and other braking functions within the braking system, these ascertained actual and threshold values can also be transmitted to the drive control unit, with the result that additional computational effort and processing effort can be spared. Moreover, a plausibilization can be carried out if a rotational behavior, or threshold value, ascertained by the drive system is compared with that of the braking system.

According to various embodiments, it can further be provided that the limit driving torque and/or the limit drive rotational speed are/is specified or adjusted, in dependence on the braking torque applied by the actuated service brakes, such that, as a result of the limitation of the setpoint driving torque and/or of the setpoint drive rotational speed for the drive by which the wheel with the inadmissible control deviation is being driven, in combination with the application of the braking torque at the same wheel, the actual wheel dynamics variable of the respective wheel falls below the threshold value again and/or an admissible control deviation for the respective wheel is established again. Advantageously, a braking action and a drive action are thus applied to the one wheel and together ensure an admissible rotational behavior of the respective wheel, so that an optimum propulsion is at the same time obtained for this drive action only at the other wheel of the same vehicle axle.

According to various embodiments, it is further provided that the braking demand signal is transmitted from the drive control unit to the brake control unit via a data connection, in particular a CAN data bus. In this manner, robust and rapid data transmission is achieved, so that, if a braking action is to be applied, a rapid and reliable intervention at the respective wheel is obtained.

According to various embodiments, it is further provided that, if an inadmissible control deviation is present for the wheel that is being driven by a drive, first of all, the setpoint driving torque and/or the setpoint drive rotational speed for the drive by which the wheel with the inadmissible control deviation is being driven is limited to a limit driving torque and/or a limit drive rotational speed, and then, if control deviations that are different on different sides are ascertained for the wheels of a vehicle axle, an external braking demand signal is generated by the drive control unit and outputted to the brake control unit, and the service brake at least on that wheel of the respective vehicle axle for which a higher control deviation is present is actuated on the basis of the signal, whereupon the limit driving torque and/or the limit drive rotational speed is then adjusted in dependence on the braking torque applied by the actuated service brakes.

The drive power is thus first reduced in order to "mitigate" the inadmissible rotational behavior. Only then is the braking action built up at the respective wheel and the drive power increased again by adjustment of the limit driving torque, or of the limit drive rotational speed. Thus, the quicker control circuit in the drive control unit is first used to eliminate the unsafe state, and only then is the slower control circuit in the brake control unit addressed. A higher priority is thus given to the safer state, that is, the admissible rotational behavior, than to better propulsion.

In principle, however, the respective service brake on each individual side could first be actuated, and only then or at the same time, the drive power could be limited by limiting the setpoint driving torque, or the setpoint drive rotational speed.

According to the disclosure there is also provided a drive control unit for a vehicle, in particular for carrying out the method according to the disclosure, having input interfaces and output interfaces, wherein the drive control unit is configured to generate a setpoint driving torque and/or a setpoint drive rotational speed in dependence on a drive demand and to output them/it to at least one electric drive of the vehicle via the output interfaces, wherein the drive control unit is further configured:

to ascertain or to import via the input interface a vehicle velocity of the vehicle;

to ascertain or to import via the input interface at least one actual wheel dynamics variable that characterizes the rotational behavior of an individual wheel of the vehicle;

to ascertain or to import via the input interface threshold values, assigned to the wheels, for the respective actual wheel dynamics variable;

to ascertain a control deviation between the actual wheel dynamics variable of a wheel and the threshold value assigned to the same wheel and, if an inadmissible control deviation is present for the wheel that is being driven by a drive, in particular if the threshold value for that wheel is exceeded:

to limit the generated and outputted setpoint driving torque and/or the generated and outputted setpoint drive rotational speed for the drive by which the wheel with the inadmissible control deviation is being driven to a limit driving torque and/or a limit drive rotational speed, and to ascertain whether the inadmissible control deviation for the respective wheel is different from a control deviation for at least one further wheel that is on the same vehicle axle and is being driven by the same drive, wherein the drive control unit is configured, if control deviations that are different on different sides are ascertained for the wheels of a vehicle axle, to generate an external braking demand signal and to output it via the output interface, such that, on the basis of the signal, a service brake can be actuated at least on that wheel of the respective vehicle axle for which a higher control deviation is present, wherein the drive control unit is configured to specify or to adjust the limit driving torque and/or the limit drive rotational speed in dependence on the braking torque applied by the actuated service brakes.

According to various embodiments, it is additionally provided that the drive control unit is configured:

in a wheel-individual drive mode, to actuate electric drives on the individual wheels, and in an axle-individual drive mode, which is preferred for the method according to the disclosure, to actuate at least one electric drive which jointly drives the wheels of at least one vehicle axle of the vehicle. Thus, the drive control unit can accordingly be operated in different modes.

BRIEF DESCRIPTION OF DRAWINGS

The invention will now be described with reference to the drawings wherein.

DETAILED DESCRIPTION

Figure 1A:
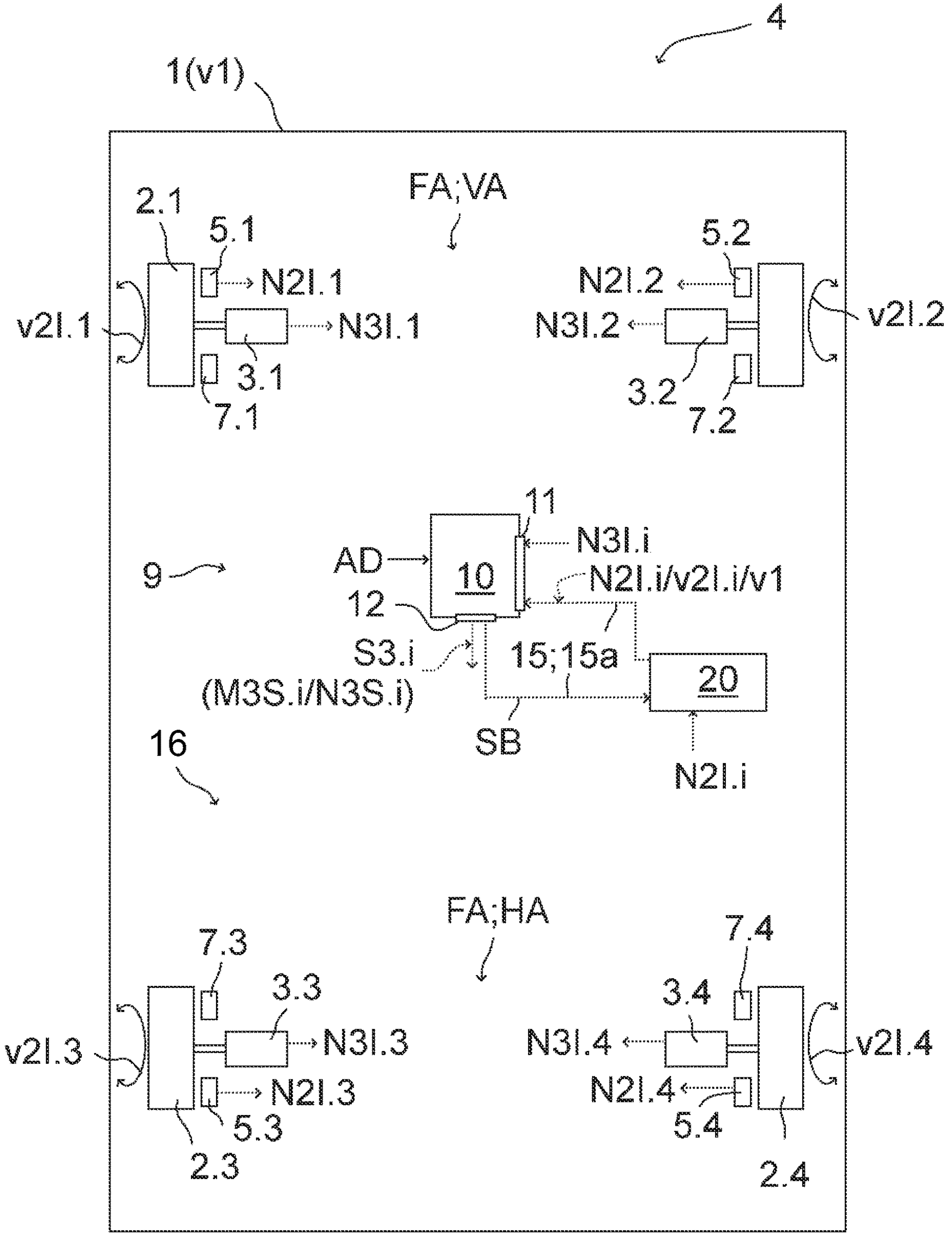
FIGS. 1A and 1B show a schematic view of a vehicle.
Figure 1B:
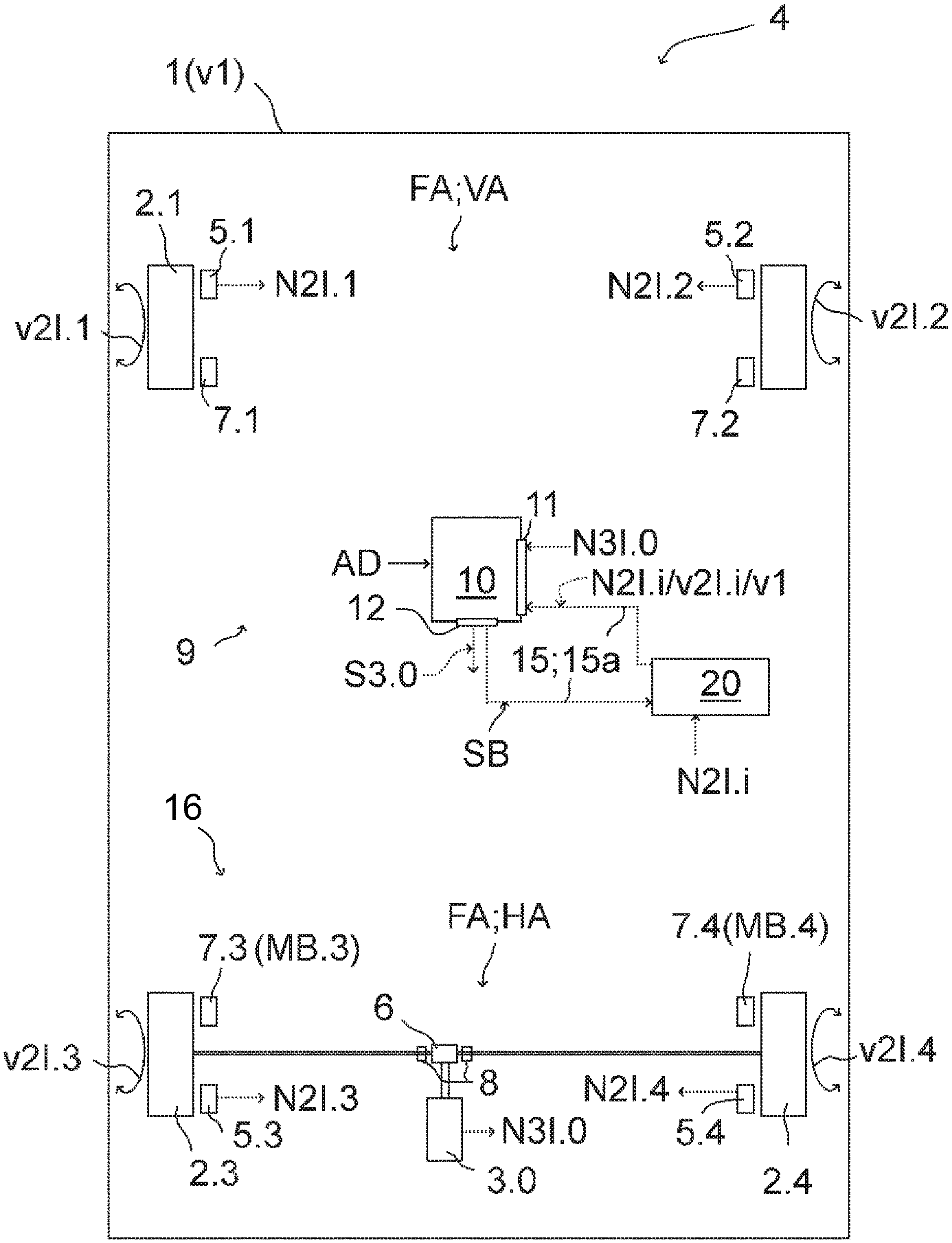

FIG. 1A shows a vehicle 1 with wheels 2.*i* (i=1, 2, 3, 4), wherein each wheel 2.*i* can be driven individually via an electric drive 3.*i* (i=1, 2, 3, 4), for example via an electric motor. FIG. 1B, by contrast, shows a vehicle 1 in which the wheels 2.*i* of only one vehicle axle FA, here by way of example the rear axle HA, are jointly driven via a central electric drive 3.0 (central drive), distributed via a differential 6. In a comparable manner, it is also possible to provide an electric drive assigned to the front axle VA (not shown). Depending on the drive mode, the vehicle 1, or the wheels 2.*i*, can thus be electrically driven in a wheel-individual or axle-individual manner.

In such a vehicle 1, the respective drives 3.*i* (i=0, 1, 2, 3, 4) are electrically controlled by a central drive control unit 10 of a drive system 9, the unit to that end generating drive control signals S3.*i* (i=0, 1, 2, 3, 4) and outputting them via an output interface 12 to the respective drives 3.*i* in order to accelerate the vehicle 1 on a road 4 in accordance with a drive demand AD that is made manually or in an automated manner. Setpoint driving torques M3S.i and/or setpoint drive rotational speeds N3S.i for the respective $i^{th}$ electric drive 3.*i* can be encoded in the drive control signals S3.*i*, the electric drive then implementing these signals accordingly in a wheel-individual or axle-individual manner.

The drive control unit 10 further includes one or more input interfaces 11, via which:

a vehicle velocity v1 of the vehicle 1 relative to the road 4, and actual wheel rotational speeds N2I.i of the individual wheels 2.*i*, and/or actual wheel circumferential velocities v2I.i of the individual wheels 2.*i*, and/or actual drive rotational speeds N3I.i of the individual drives 3.*i* can be imported. Accordingly, on the one hand information about the velocity of the vehicle 1 as a whole is imported and, in addition, information about the rotational behavior or the drive behavior of the individual wheels 2.*i* is imported on a wheel-individual or axle-individual basis.

The vehicle velocity v1 can be provided, for example, by a brake control unit 20 of the electronic braking system 16 (EBS), the brake control unit ascertaining the vehicle velocity in any desired manner. The actual wheel rotational speed N2I.i of the $i^{th}$ wheel 2.*i* can be measured via a wheel rotational speed sensor 5.*i* on the $i^{th}$ wheel 2.*i*, and the actual drive rotational speeds N3I.i of the $i^{th}$ electric drive 3.*i* can be measured via an incremental encoder or via a resolver within the respective $i^{th}$ drive 3.*i*. It is here assumed that the actual wheel rotational speeds N2I.i of the $i^{th}$ wheel 2.*i* correspond to the actual drive rotational speeds N3I.i of the $i^{th}$ drive 3.*i* that drives the $i^{th}$ wheel 2.*i*, or that there is a fixed relationship, so that the actual wheel rotational speeds N2I.i of the respective wheel 2.*i* can be derived from the actual drive rotational speeds N3I.i of the drive 3.*i* assigned to this wheel 2.*i* via a fixed relationship, for example a transformation constant. Alternatively, the actual wheel rotational speeds N2I.i of the $i^{th}$ wheel 2.*i*, in the embodiment according to FIG. 1B, can also be measured by rotational speed sensors 8 that are in each case arranged on different sides downstream of outputs of the differential 6.

The actual wheel rotational speeds N2I.i, and/or the actual wheel circumferential velocities v2I.i which can be calculated therefrom, of the individual wheels 2.*i* are normally already available as part of a control, in particular ABS control, carried out in the brake control unit 20 and can be transmitted to the central drive control unit 10, for example, via a corresponding data connection 15, for example a CAN bus 15*a*. However, the drive control unit 10, in addition to the brake control unit 20, can also be connected directly in a signal-transmitting manner to the wheel rotational speed sensors 5.*i* on the individual wheels 2.*i*, for example via a Y-piece, and can itself receive the actual wheel rotational speeds N2I.i (in an analog/digital manner) via the sensors.

Figure 2:
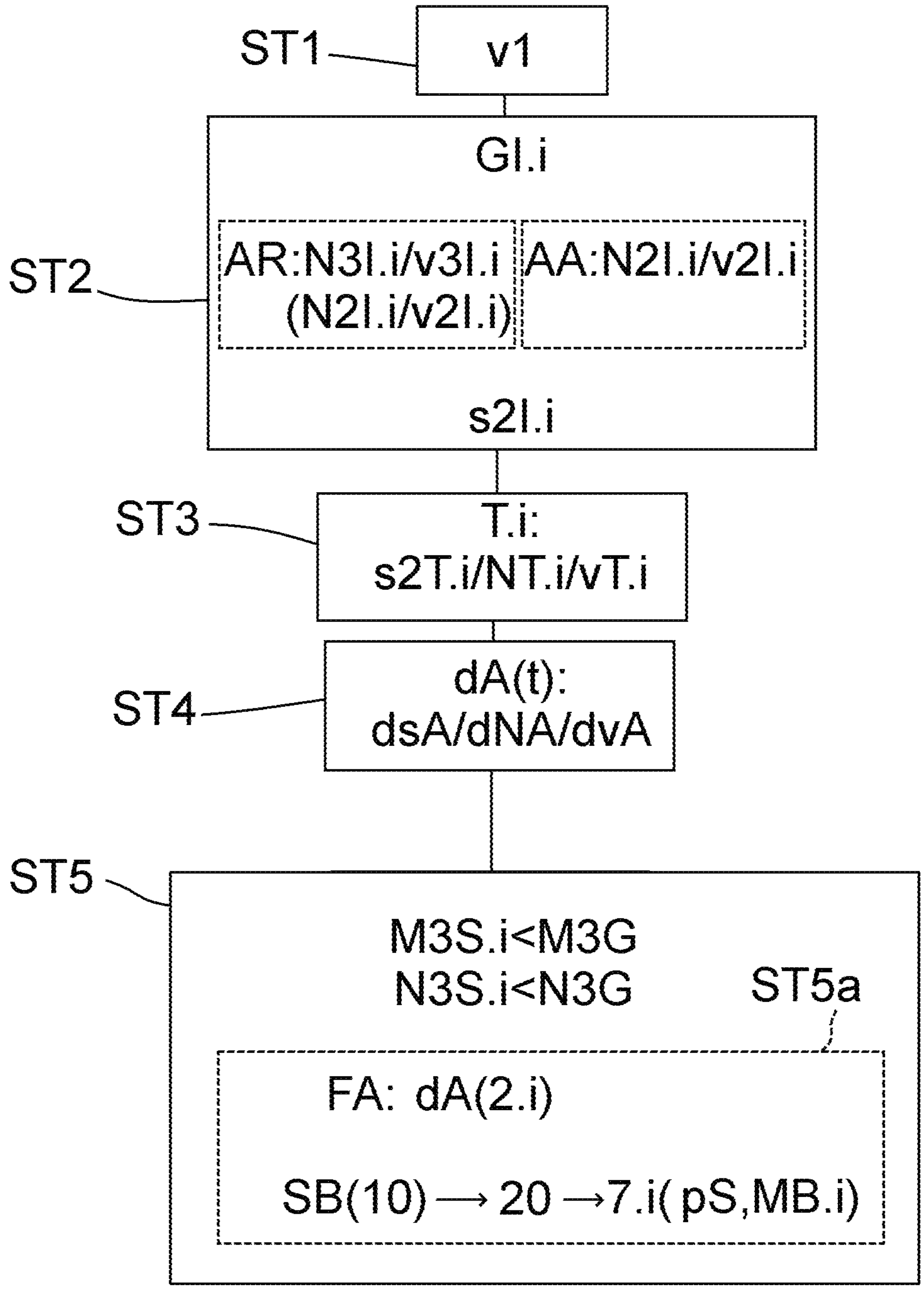
FIG. 2 shows a flow diagram of the method according to the disclosure.

With this construction, the method shown by way of example in FIG. 2 for controlling the vehicle 1 can be implemented as follows:

In a first step ST1, the vehicle velocity v1 is first imported, and in a second step ST2 the wheel-individual rotational behavior or drive behavior (affected by slip) of the individual wheels 2.*i* is imported, wherein there are imported or ascertained for this purpose as the actual wheel dynamics variables GI.i concerning the $i^{th}$ wheel 2.*i*, as described above, in the case of the wheel-individual drive mode AR, the actual drive rotational speeds N3I.i and/or actual drive velocities v3I.i, which can be calculated therefrom, of the drives 3.*i*, and/or in the case of the axle-individual drive mode AA (central drive), the actual wheel rotational speeds N2I.i and/or the actual wheel circumferential velocities v2I.i of the individual wheels 2.*i*. In the case of the wheel-individual drive mode AR, it is additionally possible to use as redundancy or for plausibilization the actual wheel rotational speeds N2I.i and/or the actual wheel circumferential velocities v2I.i of the individual wheels 2.*i*, which are the same or between which there is a defined, constant relationship.

As further actual wheel dynamics variables GI.i there can also be ascertained, independently of the drive mode AA, AR, the actual slips s2I.i for the individual wheels 2.*i*. The actual slip s2I.i for the respective wheel 2.*i* is obtained, for example, as a percentage or as an absolute value from the actual wheel rotational speeds N2I.i for the respective wheel 2.*i* (or the actual drive rotational speeds N3I.i for the respective drive 3.*i*) and the vehicle velocity v1. The actual slip s2I.i characterizes the velocity difference between the road velocity (vehicle velocity v1) and the actual wheel circumferential velocity v2I.i of the respective wheel 2.*i*, which is given by the actual wheel rotational speeds N2I.i and which can also be derived from the actual drive velocity v3I.i for the respective drive 3.*i* of the respective wheel 2.*i*.

In a third step ST3, a threshold value T.i is imported or ascertained for each wheel 2.*i*, wherein the threshold value can be a slip threshold value s2T.i and/or a rotational speed threshold value NT.i and/or a velocity threshold value vT.i. These threshold values T.i; s2T.i; NT.i, vT.i indicate:

which actual slip s2I.i for the $i^{th}$ wheel 2.*i* (slip threshold value s2T.i), or which actual rotational wheel speed N2I.i for the $i^{th}$ wheel 2.*i* or which actual drive rotational speed N3I.i for the $i^{th}$ drive 3.*i* on the $i^{th}$ wheel 2.*i* (rotational speed threshold value NT.i), or which actual wheel circumferential velocities v2I.i for the $i^{th}$ wheel 2.*i* or which actual drive velocity v3I.i for the $i^{th}$ drive 3.*i* of the $i^{th}$ wheel 2.*i* (velocity threshold value vT.i)

are admissible in view of operation of the vehicle 1 that is unproblematic in respect of drive dynamics, wherein this may optionally also be situation-dependent.

The respective threshold value T.i; s2T.i; NT.i, vT.i can be ascertained by the drive control unit 10 itself or by the brake control unit 20, for example as part of the stability control implemented therein. The brake control unit 20 then transmits the respective threshold value T.i; s2T.i; NT.i, vT.i to the drive control unit 10 via the data connection 15, for example the CAN bus 15*a*, and the respective input interface 11.

In a fourth step ST4, a wheel-individual (in the case of the wheel-individual drive mode AR) or axle-individual (in the case of the axle-individual drive mode AA) control deviation dA, that is, a slip control deviation dsA and/or rotational speed control deviation dNA and/or velocity control deviation dvA, is ascertained over time t. The control deviation dA indicates, on a wheel-individual or axle-individual basis, the difference between the respective actual wheel dynamics variable GI.i and the threshold value T.i of the same variable.

The slip control deviation dsA thus indicates the difference between the actual slip s2I.i of the respective wheel 2.*i* and the respective slip threshold value s2T.i (wheel-individual), or between the actual slips s2I.i of the wheels 2.*i* of the respective vehicle axle FA (generally the higher actual slip s2I.i of the wheels 2.*i* of the respective vehicle axle FA (select-high) or as a mean value) and the respective slip threshold values s2T.i for these wheels 2.*i* (for example, select-high or as a mean value) (axle-individual). The rotational speed control deviation dNA accordingly indicates the difference between the actual wheel rotational speeds N2I.i of the respective wheel 2.*i* or the actual drive rotational speeds N3I.i for the respective drive 3.*i* and the respective rotational speed threshold value NT.i (wheel-individual), or between the actual wheel rotational speeds N2I.i of the wheels 2.*i* or the actual drive rotational speeds N3I.i of the drives 3.*i* of the respective vehicle axle FA (for example, select-high or as a mean value) and the respective rotational speed threshold values NT.i for these wheels 2.*i* (for example, select-high or as a mean value) (axle-individual). The velocity control deviation dvA accordingly indicates the difference between the actual wheel circumferential velocities v2I.i of the respective wheel 2.*i* or the actual drive velocities v3I.i for the respective drive 3.*i* and the respective velocity threshold value vT.i (wheel-individual), or between the actual wheel circumferential velocities v2I.i of the wheels 2.*i* or the actual drive velocity v3I.i of the drives 3.*i* of the respective vehicle axle FA (for example, select-high or as a mean value) and the respective velocity threshold values vT.i for these wheels 2.*i* (for example, select-high or as a mean value) (axle-individual).

If an inadmissible control deviation dA, that is, slip control deviation dsA and/or rotational speed control deviation dNA and/or velocity control deviation dvA, is ascertained for at least one wheel 2.*i*, from which it follows, for example, that the respective threshold values T.i; s2T.i; NT.i, vT.i have been exceeded, then the drives 3.*i* of this at least one wheel 2.*i* are actuated in a fifth step ST5 with not more than a specified limit driving torque M3G, or with not more than a specified limit drive rotational speed N3G. For the wheels 2.*i* that are slipping too greatly, the setpoint driving torques M3S.i and/or setpoint drive rotational speeds N3S.i transmitted via the respective drive control signal S3.*i* are thus limited. In the case of the wheel-individual drive mode AR, this limitation is carried out for each wheel, and in the case of an axle-individual drive mode AA, it is correspondingly carried out for each axle.

By limiting the setpoint driving torques M3S.i and/or setpoint drive rotational speeds N3S.i for the respective drives 3.*i* in this manner, the actual slip s2I.i or the actual wheel rotational speed N2I.i or the actual drive rotational speed N3I.i or the actual wheel circumferential velocity v2I.i or the actual drive velocity v3I.i at the respective wheels 2.*i* or drives 3.*i* that are affected is correspondingly likewise limited, or so controlled that an admissible slip control deviation dsA and/or rotational speed control deviation dNA and/or velocity control deviation dvA is obtained again. The respective wheel 2.*i* subjected to drive slip is thus "caught" again.

In the case of an axle-individual drive mode AA, it is additionally monitored in a sub-step ST5*a*, via the actual wheel rotational speeds N2I.i provided by the wheel rotational speed sensors 5.*i*, whether rotational behaviors of the respective wheels 2.*i* that are different on different sides are present before or after the above-mentioned limitation of the setpoint driving torques M3S.i and/or setpoint drive rotational speeds N3S.i for the respective central electric drive 3.0 and the respective vehicle axle FA. If it is established, for example, that an inadmissible control deviation dA for the respective actual wheel dynamics variable GI.i (or control deviations dA that are different on different sides) is present before or after the above-mentioned limitation of the setpoint driving torques M3S.i and/or setpoint drive rotational speeds N3S.i for only one wheel 2.*i* of this driven vehicle axle FA, then an (external) braking demand signal SB is generated by the drive control unit 10 and outputted via the output interface 12 to the brake control unit 10, for example via the serial data connection 15, in particular the CAN bus 15*a*.

An actuation of service brakes 7.*i* on individual sides of the vehicle 1 is then encoded in the braking demand signal SB. The braking demand signal SB is generated in dependence on the control deviation dA that is then present of the respective actual wheel dynamics variable GI.i for the respective wheel 2.*i* of the respective vehicle axle FA, such that a specific setpoint braking pressure pS is applied to a service brake 7.*i* assigned to this wheel 2.*i* in order to generate a specific braking torque MB.i at this wheel 2.*i*. The setpoint braking pressure pS or the resulting braking torque MB.i is specified in such a manner that the respective threshold value T.i for this wheel 2.*i*, in conjunction with the limitation of the setpoint driving torques M3S.i and/or setpoint drive rotational speeds N3S.i for the respective central electric drive 3.0, is maintained again.

A wheel 2.*i* of a vehicle axle FA that is driven too strongly is thus no longer "caught" again only by limiting the setpoint driving torques M3S.i and/or setpoint drive rotational speeds N3S.i for the respective central electric drive 3.0, but in addition by braking the respective wheel 2.*i* on an individual side. This has the result that the limitation of the setpoint driving torques M3S.i and/or setpoint drive rotational speeds N3S.i for the respective central electric drive 3.0 also no longer has to be so great, since part of the inadmissible rotational behavior of a wheel 2.*i* is corrected via the respective service brake 7.*i*.

The limit driving torque M3G, or the limit drive rotational speed N3G, for the central electric drive 3.0 can thus be chosen to be higher, in coordination with the braking demand signal SB or the setpoint braking pressure pS or the resulting braking torque MB.i, from the outset (if a braking torque MB.i is already acting) or in a subsequent adjustment (if the braking torque MB.i is only built up subsequently). This has the result, in the case of a central drive, that the other wheel 2.*i* of this vehicle axle FA is driven with a higher setpoint driving torque M3S.i (compared to the case without a brake intervention) (because the limitation is no longer so great). It is thus possible that, via the other wheel 2.*i*, for which no inadmissible control deviation dA or an inadmissible control deviation dA that is smaller compared to the other wheel 2.*i* of the vehicle axle FA is present, a high driving torque can also continue to be transmitted. As a result, the propulsion of the vehicle 1 is improved in particular under u-split conditions, that is, when the coefficients of friction on the road 4 are different on different sides.

Preferably, it is thus generally provided in sub-step ST5*a* that, under u-split conditions, which can be recognized by a rotational behavior that is different on different sides, that wheel 2.*i* of a vehicle axle FA for which the smaller control deviation dA is present is "caught" again (threshold value T.i is maintained again) only via the limitation of the setpoint driving torques M3S.i and/or setpoint drive rotational speeds N3S.i for the respective central electric drive 3.0. The respective other wheel 2.*i* of this vehicle axle FA with the higher control deviation dA is then additionally "caught" again by a brake intervention on the individual side, as described.

In summary, the limit driving torque M3G, or the limit drive rotational speed N3G, for the central electric drive 3.0 is thus specified, in coordination with the braking demand signal SB or the setpoint braking pressure pS or the resulting braking torque MB.i for the respective wheel 2.*i*, in such a manner that the greatest possible propulsion is made possible for the wheel 2.*i* of a vehicle axle FA that has the lower (or even no) control deviation dA. The following possibilities in particular are conceivable for the implementation:

If it is established that the rotational behavior of the respective wheels 2.*i* of a vehicle axle FA is different on different sides, or that a different control deviation dA is present on different sides, the braking demand signal SB is first generated and outputted by the drive control unit 10 in order to achieve individual braking at the wheel 2.*i* of a vehicle axle FA with the higher control deviation dA. Only then does a limitation of the drive behavior take place, or is the limit driving torque M3G or the limit drive rotational speed N3G specified in dependence on the braking torque MB.i that is then acting. Since the brake control circuit is normally less dynamic, the limitation of the drive behavior and thus the elimination of the inadmissible control deviation dA is delayed.

In order to optimize this, it is possible first to limit the drive behavior or to specify the limit driving torque M3G or the limit drive rotational speed N3G in dependence on the control deviation dA that is present (for example, select-high), which can take place with a very high control dynamics. This limitation can then subsequently be adjusted when the setpoint braking pressure pS or the resulting braking torque MB.i for the respective wheel 2.*i* with the higher control deviation dA is subsequently or simultaneously built up. The limitation is thus reduced, which has the advantage that the inadmissible control deviation dA is first corrected highly dynamically, and then the propulsion is optimized in a higher-level braking control, which takes place somewhat more slowly.

In this manner, it is possible, via the brake control unit 10 and via the service brakes 7.*i* acting on each wheel individually, to access a higher-level (slower) slip control circuit, which supplements the subordinate highly dynamic slip control circuit via the drive control unit 10 and the limitation of the setpoint driving torques M3S.i and/or setpoint drive rotational speeds N3S.i, in order to improve the performance even in the case of a non-wheel-individual, axle-individual drive mode AA.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 vehicle
2.*i* wheels (i=1, 2, 3, 4)
3.*i* electric drive (i=0, 1, 2, 3, 4)
4 road 5.*i* wheel rotational speed sensor on the $i^{th}$ wheel 2.*i* (i=1, 2, 3, 4)
6 differential
7.*i* service brake on the $i^{th}$ wheel 2.*i*
8 rotational speed sensor
9 drive system
10 drive control unit
11 input interface
12 output interface
15 data connection
16 braking system
20 brake control unit
AA axle-individual drive mode
AD drive demand
AR wheel-individual drive mode
dA control deviation
dNA rotational speed control deviation
dvA velocity control deviation
dsA slip control deviation
FA vehicle axle
GI.i actual wheel dynamics variable for the $i^{th}$ wheel 2.*i* (i=1, 2, 3, 4)
HA rear axle
M3S.i setpoint driving torque for the $i^{th}$ drive 3.*i* (i=0, 1, 2, 3, 4)
MB.i braking torque at the $i^{th}$ wheel (i=1, 2, 3, 4)
N2I.i actual wheel rotational speed of the $i^{th}$ wheel 2.*i* (i=1, 2, 3, 4)
N3S.i setpoint drive rotational speed for the $i^{th}$ drive 3.*i* (i=0, 1, 2, 3, 4)
N3I.i actual drive rotational speed of the $i^{th}$ drive 3.*i* (i=1, 2, 3, 4)
NT.i rotational speed threshold value for the $i^{th}$ wheel 2.*i*
pS setpoint braking pressure
s2I.i actual slip of the $i^{th}$ wheel 2.*i*
s2T.i slip threshold value for the $i^{th}$ wheel 2.*i*
S3.*i* drive control signal (i=0, 1, 2, 3, 4)
T.i threshold value for the $i^{th}$ wheel 2.*i*
VA front axle
v1 vehicle velocity
v2I.i actual wheel circumferential velocity of the $i^{th}$ wheel 2.*i* (i=1, 2, 3, 4)
v3I.i actual drive velocity of the $i^{th}$ drive 3.*i* (i=1, 2, 3, 4)
vT.i velocity threshold value for the $i^{th}$ wheel 2.*i*

The invention claimed is:

1. A method for controlling a vehicle having a drive system, wherein the drive system includes a drive control unit and at least one electric drive for wheel-individual or axle-individual driving of wheels of the vehicle, wherein the drive control unit is configured to generate at least one of a setpoint driving torque and a setpoint drive rotational speed in dependence on a drive demand and to output the at least one of the setpoint driving torque and the setpoint drive rotational speed to a corresponding one of the at least one electric drive, wherein the drive system further includes a braking system having a brake control unit and service brakes for wheel-individual braking of the wheels of the vehicle, the method comprising:

importing or ascertaining a vehicle velocity of the vehicle;

importing or ascertaining at least one actual wheel dynamics variable that characterizes rotational behavior of an individual wheel;

importing or ascertaining threshold values, assigned to the wheels, for the respective actual wheel dynamics variable;

ascertaining a control deviation between the actual wheel dynamics variable of the individual wheel and the threshold value assigned to the wheel;

if an inadmissible control deviation for the wheel that is being driven by a drive is present:

limiting at least one of the setpoint driving torque and the setpoint drive rotational speed for the drive by which the wheel with the inadmissible control deviation is being driven to at least one of a limit driving torque and a limit drive rotational speed, and, ascertaining whether the inadmissible control deviation for the respective wheel is different from a control deviation for at least one further wheel that is on a same vehicle axle and is being driven by said drive;

wherein, if control deviations that are different on different sides are ascertained for the wheels of the vehicle axle, an external braking demand signal is generated by the drive control unit and outputted to the brake control unit, and the service brake at least on that wheel of the respective vehicle axle for which a higher control deviation is present is actuated on the basis of said signal, wherein the at least one of the limit driving torque and the limit drive rotational speed is specified or adjusted in dependence upon braking torque applied by the actuated service brakes.

2. The method of claim 1, wherein there is ascertained or imported as the actual wheel dynamics variable at least one of:

an actual slip of the respective wheel;

an actual rotational speed of the respective wheel or of the respective drive; and, an actual velocity of the respective wheel or of the respective drive.

3. The method of claim 2, wherein actual wheel rotational speeds of the respective wheel are ascertained or imported as the actual wheel dynamics variable, wherein the actual wheel rotational speeds are measured via a wheel rotational speed sensor on the respective wheel or via a rotational speed sensor downstream of outputs on different sides of a differential.

4. The method of claim 1, wherein there is ascertained or imported as the threshold value for the respective wheel at least one of:

a slip threshold value;

a rotational speed threshold value; and, a velocity threshold value.

5. The method of claim 1, wherein the actual wheel dynamics variable for the respective wheel is ascertained or imported by at least one of the drive control unit and the brake control unit.

6. The method of claim 1, wherein the threshold value for the respective wheel is ascertained in at least one of the drive control unit and the brake control unit.

7. The method of claim 1, wherein at least one of the limit driving torque and the limit drive rotational speed is specified or adjusted in dependence upon the braking torque applied by the actuated service brakes, such that, as a result of the limitation of at least one of the setpoint driving torque and the setpoint drive rotational speed for the drive by which the wheel with the inadmissible control deviation is being driven, in combination with the application of the braking torque at the same wheel, the actual wheel dynamics variable of the respective wheel falls below the threshold value again and/or an admissible control deviation for the respective wheel is established again.

8. The method of claim 1, wherein the braking demand signal is transmitted from the drive control unit to the brake control unit via a data connection.

9. The method of claim 1, wherein the braking demand signal is transmitted from the drive control unit to the brake control unit via a a CAN data bus.

10. The method of claim 1, wherein, if the inadmissible control deviation is present for the wheel that is being driven by the drive:

first, at least one of the setpoint driving torque and the setpoint drive rotational speed for the drive by which the wheel with the inadmissible control deviation is being driven is limited to at least one of the limit driving torque and the limit drive rotational speed; and, subsequently, if control deviations that are different on different sides are ascertained for the wheels of a vehicle axle, an external braking demand signal is generated by the drive control unit and outputted to the brake control unit, and the service brake at least on that wheel of the respective vehicle axle for which a higher control deviation is present is actuated on a basis of said signal, whereupon the at least one of the limit driving torque and the limit drive rotational speed is then adjusted in dependence on the braking torque applied by the actuated service brakes.

11. The method of claim 1, wherein said limiting at least one of the setpoint driving torque and the setpoint drive rotational speed for the drive by which the wheel with the inadmissible control deviation is being driven to at least one of the limit driving torque and the limit drive rotational speed, and, said ascertaining whether the inadmissible control deviation for the respective wheel is different from a control deviation for at least one further wheel that is on a same vehicle axle and is being driven by said drive, are performed when the threshold value for that wheel is exceeded.

12. A drive control unit for a vehicle having a plurality of wheels, the drive control unit comprising:

an input interface;

an output interface;

the drive control unit being configured to generate at least one of a setpoint driving torque and a setpoint drive rotational speed in dependence upon a drive demand and to output the at least one of the setpoint driving torque and the setpoint drive rotational speed to at least one electric drive of the vehicle via said output interface;

the drive control unit being further configured:

to ascertain or to import via the input interface a vehicle velocity of the vehicle;

to ascertain or to import via the input interface at least one actual wheel dynamics variable that characterizes rotational behavior of an individual wheel of the plurality of wheels of the vehicle;

to ascertain or to import via the input interface threshold values, assigned to the wheels, for the respective actual wheel dynamics variable;

to ascertain a control deviation between the actual wheel dynamics variable of a wheel and the threshold value assigned to the same wheel;

if an inadmissible control deviation is present for the wheel that is being driven by a drive:

to limit at least one of the generated and outputted setpoint driving torque and the generated and outputted setpoint drive rotational speed for the drive by which the wheel with the inadmissible control deviation is being driven to at least one of a limit driving torque and a limit drive rotational speed, and, to ascertain whether the inadmissible control deviation for the respective wheel is different from a control deviation for at least one further wheel that is on a same vehicle axle and is being driven by the same drive; and, wherein the drive control unit is configured, if control deviations that are different on different sides are ascertained for the wheels of the vehicle axle, to generate an external braking demand signal and to output it via the output interface, such that, on a basis of said signal, a service brake can be actuated at least on that wheel of the respective vehicle axle for which a higher control deviation is present, wherein the drive control unit is configured to specify or to adjust at least one of the limit driving torque and the limit drive rotational speed in dependence upon braking torque applied by the actuated service brakes.

13. The drive control unit of claim 12, wherein the drive control unit is configured:

in a wheel-individual drive mode, to actuate electric drives on the individual wheels; and, in an axle-individual drive mode, to actuate at least one electric drive which jointly drives the wheels of at least one vehicle axle of the vehicle.

14. The drive control unit of claim 12, wherein the drive control unit is configured, if the threshold value for that wheel is exceeded, to:

to limit at least one of the generated and outputted setpoint driving torque and the generated and outputted setpoint drive rotational speed for the drive by which the wheel with the inadmissible control deviation is being driven to at least one of the limit driving torque and the limit drive rotational speed, and, to ascertain whether the inadmissible control deviation for the respective wheel is different from a control deviation for at least one further wheel that is on the same vehicle axle and is being driven by the same drive.

15. A vehicle comprising:

a plurality of wheels;

a drive control unit having input interfaces and output interfaces; and, a brake control unit connected thereto in a signal-transmitting manner for carrying out the method of claim 1.

* * * * *